(12) United States Patent
Kiraly

(10) Patent No.: US 7,324,663 B2
(45) Date of Patent: Jan. 29, 2008

(54) FLIGHT PARAMETER MEASUREMENT SYSTEM

(75) Inventor: Chris Kiraly, San Diego, CA (US)

(73) Assignee: Wintriss Engineering Corporation, San Diego, CA (US)

( * ) Notice: Subject to any disclaimer, the term of this patent is extended or adjusted under 35 U.S.C. 154(b) by 793 days.

(21) Appl. No.: 10/456,054

(22) Filed: Jun. 6, 2003

(65) Prior Publication Data

US 2004/0032970 A1 Feb. 19, 2004

Related U.S. Application Data

(60) Provisional application No. 60/419,389, filed on Oct. 17, 2002, provisional application No. 60/389,338, filed on Jun. 13, 2002, provisional application No. 60/387,556, filed on Jun. 6, 2002.

(51) Int. Cl.
G06K 9/00 (2006.01)
G06K 9/36 (2006.01)
H04N 5/225 (2006.01)

(52) U.S. Cl. ............... 382/103; 382/154; 382/181; 382/285; 348/169

(58) Field of Classification Search ............... None
See application file for complete search history.

(56) References Cited

U.S. PATENT DOCUMENTS

| | | | | |
|---|---|---|---|---|
| 4,136,387 A * | 1/1979 | Sullivan et al. | ............. | 473/200 |
| 5,335,032 A * | 8/1994 | Onuki et al. | ............. | 396/50 |
| 5,471,383 A * | 11/1995 | Gobush et al. | ............. | 700/91 |
| 5,805,742 A * | 9/1998 | Whitsitt | ............. | 382/275 |
| 6,233,007 B1 | 5/2001 | Carlbom | | |
| 6,542,824 B1 * | 4/2003 | Berstis | ............. | 701/220 |
| 6,579,190 B2 * | 6/2003 | Yamamoto | ............. | 473/141 |
| 6,592,465 B2 * | 7/2003 | Lutz et al. | ............. | 473/198 |
| 6,594,623 B1 * | 7/2003 | Wang et al. | ............. | 703/1 |
| 6,690,210 B2 * | 2/2004 | Hadjizada et al. | ............. | 327/105 |
| 2002/0085213 A1 | 7/2002 | Yamamoto | | |
| 2004/0030527 A1 * | 2/2004 | Rankin | ............. | 702/153 |

FOREIGN PATENT DOCUMENTS

| | | |
|---|---|---|
| JP | 2002148269 | 5/2002 |
| WO | WO-00/44450 | 8/2000 |

* cited by examiner

*Primary Examiner*—Bhavesh M Mehta
*Assistant Examiner*—Charles Kim
(74) *Attorney, Agent, or Firm*—Manuel F. de la Cerra

(57) ABSTRACT

A portable flight parameter measurement system is a standalone smart camera which tracks the surface of an object in motion, e.g., a ball, and determines speed, trajectory, a spin axis, and a spin rate around that axis. The measurement system is particularly suited for analyzing the path of a ball in flight which is determined, in great part, by the amount of spin and the direction of spin imparted to the ball upon impact. The measurement system provides a user, such as a golfer, with important feedback for modifying his or her swing to obtain desired results. The measurement system utilizes non-precision marks, surface blemishes such as cuts made by a club, dimples, or a combination of all three as the only features necessary to determine ball flight characteristics.

46 Claims, 5 Drawing Sheets

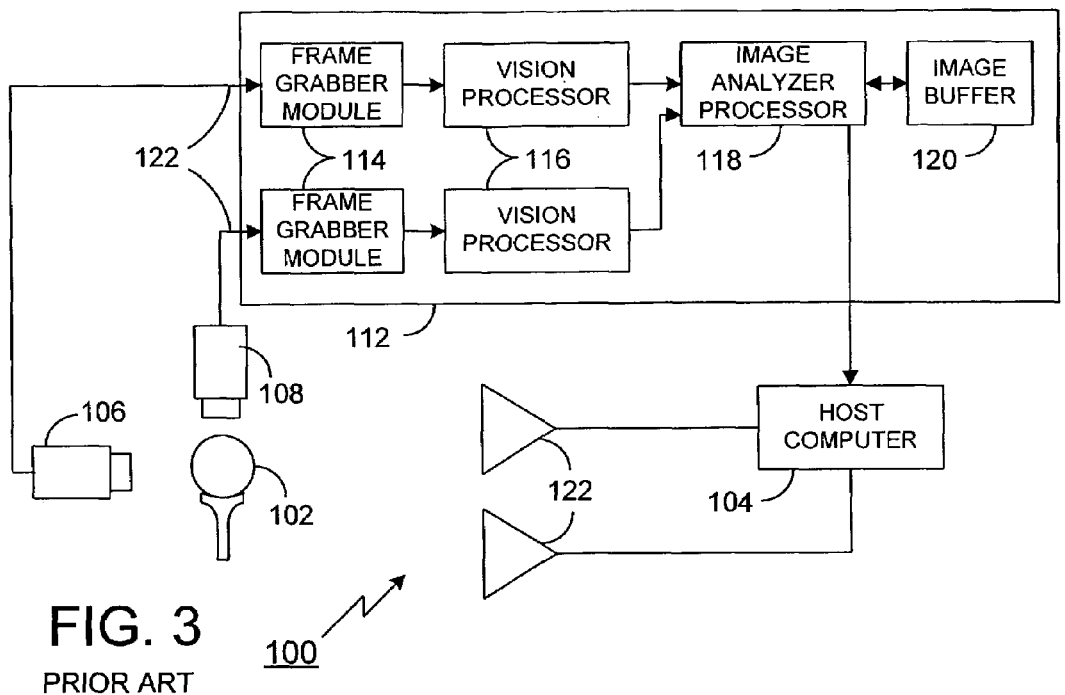
FIG. 3
PRIOR ART
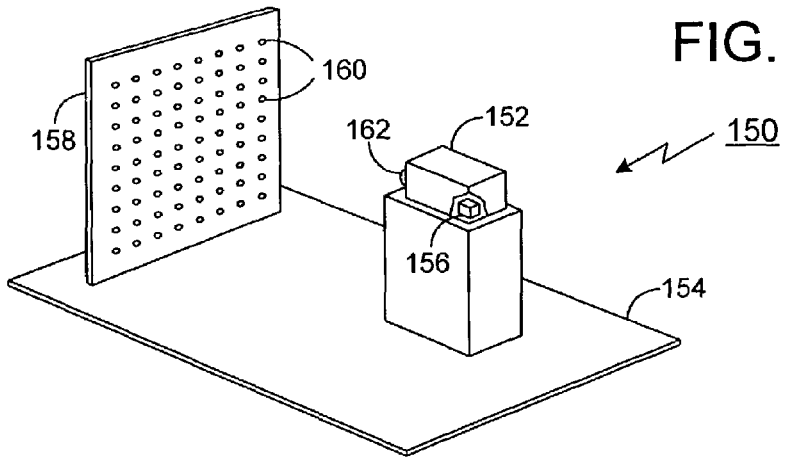
FIG. 4
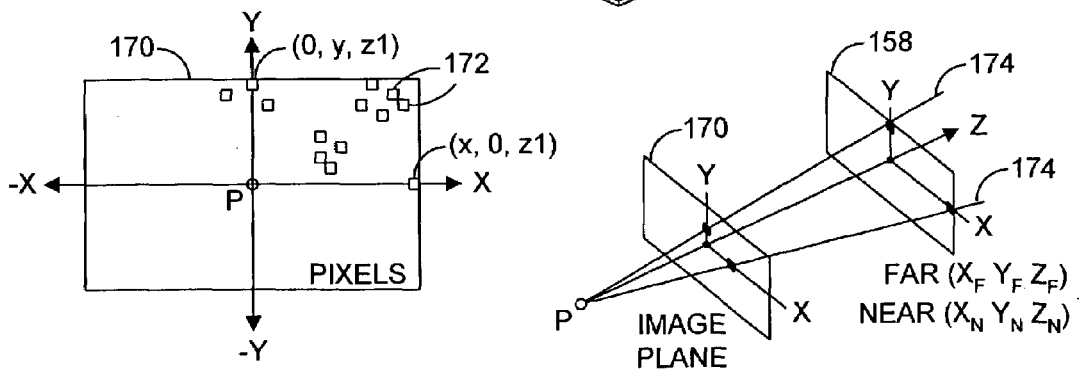
FIG. 5
FIG. 6

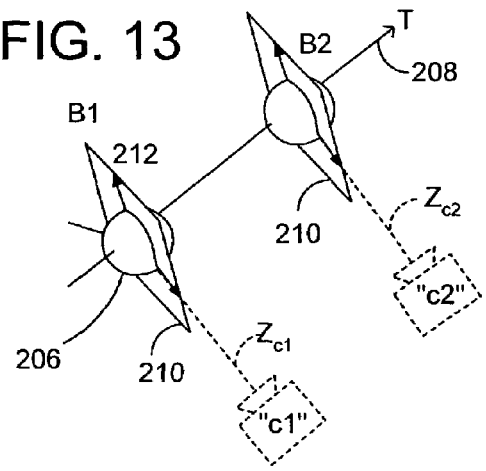
FIG. 13
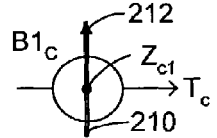
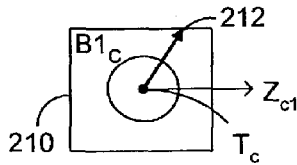
FIG. 14A  FIG. 14B
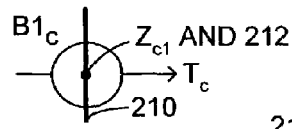
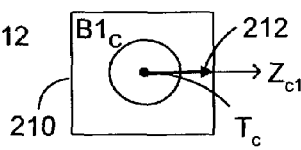
FIG. 15A  FIG. 15B
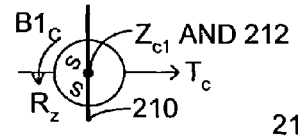
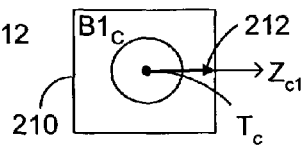
FIG. 16A  FIG. 16B
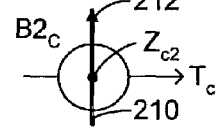
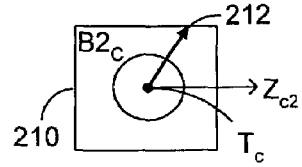
FIG. 17A  FIG. 17B
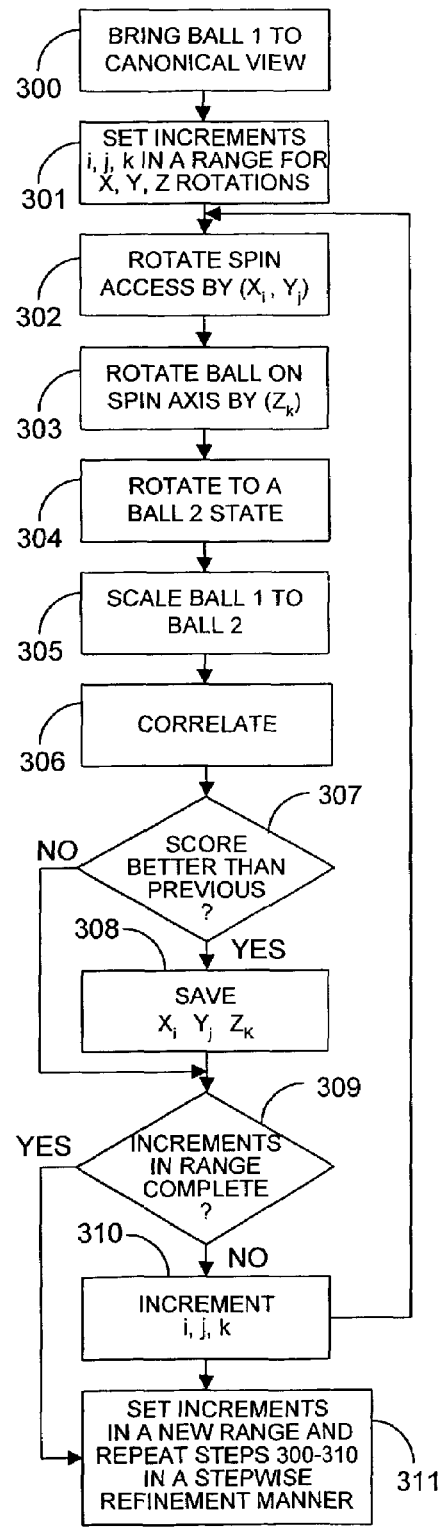
FIG. 18

FLIGHT PARAMETER MEASUREMENT SYSTEM

CROSS-REFERENCES TO RELATED APPLICATIONS

This application claims the benefit of priority under 35 U.S.C. 119(e) to U.S. Provisional Patent Applications 60/387,556, filed Jun. 6, 2002, entitled "Method for Alignment of a Golf Ball Flight Monitoring Apparatus"; 60/389,338, filed Jun. 13, 2002, entitled "Method for Initiation of Measurement in a Golf Ball Flight Monitoring Apparatus"; and 60/419,389, filed Oct. 17, 2002, entitled "Golf Ball Flight Parameter Measurement System", which are incorporated herein by reference.

FIELD OF INVENTION

The present invention relates generally to flight parameter measurement systems, and more specifically to a camera measurement system for determining the paths of objects in flight.

BACKGROUND OF THE INVENTION

The path of a ball in flight is determined, in great part, by the amount of spin and the direction of spin imparted to the ball upon impact. For example, the path of a golf ball is determined by the launch conditions measured over the first few feet of flight after the golf ball is struck by a golf club. The parameters that are used to determine the path of a golf ball are spin, launch elevation, launch azimuth and speed. Knowing the precise values of ball spin provides the golfer with important feedback for modifying his or her swing to obtain desired golf game results.

Continuing with the golf ball example, devices that provide immediate feedback of the initial spin conditions of a golf ball may be utilized by the golfer and the golf shop professional for training purposes as well as for fitting a set of golf clubs to the golfer. Such devices may also be used to test the effectiveness of golf club and golf ball design modifications by measuring the effects of the design modifications on the golf ball launch parameters. By analyzing these effects, design modifications can be evaluated and improved. Other applications of these devices include golf simulators which project the flight of the ball in a video presentation based on initial golf ball launch conditions. The aforementioned prior art devices require complex camera systems for calibration/alignment, spin measurement, triggering, image capture, and trajectory measurement which are too expensive and difficult to use for the typical golfer and golf shop professional.

Calibration and Alignment. Accurate measurement of ball flight parameters requires knowledge of the optical characteristics of a camera that is used to track the ball. Prior art systems use complex targets in the field or other optical devices to calibrate cameras. These devices are cumbersome, fragile and also must be calibrated at regular intervals. Typically, positioning the target into the field of view of a camera or cameras and obtaining the correct lighting conditions and proper focusing requires skills that are not user friendly and exceed the capabilities of the average golfer, user, and/or professional.

There are various methods for field-calibrating the camera or cameras that are commonly used in prior art systems. A first method utilizes a target with dots which is set up where the ball will be struck. The camera finds the center of each of the dots to determine a frame of reference. The target is removed and the player hits a shot. The camera then uses the frame of reference to determine how the ball is moving. This method gives very crude measurement results since the number of calibration points are too far apart to properly account for lens distortion, and the target is placed manually so that precision location of the dots cannot be determined.

A more sophisticated method is to have a target with precise reference markers, known as "fiducials", such as squares or circles, with known geometry. Software of the prior art system determines the edges or centers of each of the marks, and creates a mathematical model of the camera and lens, taking into account the distortion caused by the camera and lens system. The target is imaged at two known positions to provide a set of calibration points in three dimensions.

Prior art systems also require special precision optical alignment targets procedures that are necessary in order to locate a reference plane in space which is used for all azimuth and elevation measurements. The precision alignment targets must be imaged by the system cameras prior to each system setup. These complex alignment procedures, which require bulky and easily lost alignment targets, are difficult for lay personnel to learn, to set up and to move from place to place. In addition, the prior art alignment procedures usually require special lighting and focusing procedures for the alignment targets. Thus, the need for specialized alignment equipment, with the inherent costs and bulk, render the prior art systems inaccessible for general use, e.g., use by the public.

Spin Measurement. There are a variety of prior art systems that measure the initial spin conditions of a golf ball. A typical system uses strategically placed retroreflective or non-retroreflective dots, equatorial striping, or other specific marks on the ball. The ball then must be aligned to face the camera of the imaging system. The markings must be applied with precision, and are subject to obliteration or loss with repeated usage of the marked golf ball. The position of the dots/markings relative to a known position on the ball or relative to other dots/markings plays a central role in the precision of the measurement of the golf ball flight parameter measurements. Thus, applying these markings to the golf ball may require the use of special, costly equipment. In addition, specially marked balls preclude the ad hoc usage of a golfer's own golf balls, and require purchase of the marked balls from specialized manufacturers.

Triggering. Prior art systems for flight parameter measurement also require a separate triggering mechanisms for determining when the camera(s) should commence recording sequences of a golf ball or golf club movement, and when the measurement equipment should begin measurements. The triggering mechanisms typically involve acoustic or photo detectors which detect the moment of impact of the golf ball by the golf club. These mechanisms have significant limitations. The acoustic triggering device uses a microphone to detect the sound of the impact of a golf club on a ball. Other triggering devices employed by the prior art systems are based upon optical sensor technology for detecting an event, for example, when a golf club swings through an optical plane, e.g., a laser.

In addition to the disadvantage of requiring an additional piece of equipment for triggering, the prior art triggering devices are problematic and present disadvantages that render these devices impractical for the average golfer. For example, acoustic pickups often miss the trigger event or misfire upon receiving extraneous sounds. Trigger sensors often will not function properly when a golf ball is struck from natural, living turf. Remote photo/optical trigger sensors often require alignment and special overhead lighting since photo triggering devices typically will not function properly in an outdoor or sunlight environment. Also, laser-based sensors have a fixed, limited field of view. Trigger sensors which are remote from the measurement apparatus are easily lost or damaged, and require mounting in special ground level assemblies. In addition, precise golf ball placement is required for photo sensor or laser based triggering devices. A further disadvantage of both acoustic and optical sensors is that these sensors must be calibrated, and thus, require yet additional calibration devices.

Image Capture. Prior art cameras use the technique of multiple exposures to track the flight of the ball. The lenses are opened, and a flash strobe is used to create multiple exposures of the ball. However, this technique renders accurate analysis of ball motion difficult since multiple images are superimposed on top of each other. The multiple exposure technique will also capture multiple images of stationary background objects in the field of view that build up in intensity or bloom, potentially obscuring the images of the ball in flight. As a result, the camera must be placed in a location where the background is neutral to create the required contrast with the ball when illuminated.

Trajectory Measurement with a Single Camera. Prior art single camera systems measure spin and launch angle in a plane that is orthogonal to the field of view (FOV) of the camera. Speed, spin and launch angle are calculated in two dimensions introducing significant errors into the measured flight characteristics. Additionally, such a system cannot measure azimuth.

Prior Art Example. Prior art measurement systems as discussed above may be single or multiple camera systems. FIG. 3 illustrates a typical dual-camera measurement system 100 of the prior art. The measurement system 100 uses two area cameras 106, 108 that are positioned at two angles to a target position 102, such as a golf ball and tee. Typically, two types of sensor technologies, charge coupled device (CCD) or complementary metal oxide semiconductor (CMOS), are used in the cameras 106, 108. CMOS sensor technology allows some processing electronics to be included on the same chip as the sensor within the camera 106,108. High bandwidth camera-specific data cables 122 are required to transfer data from the area cameras 106, 108 to a vision processor 112. A typical high bandwidth data stream transfer is forty (40) million pixels per seconds, i.e., 500 Mbits per second for pixels of eight (8) bits. The mega-pixel data stream is transferred over the camera-specific cables 122 to frame grabber modules 114 in the vision processor 112. Frame grabber modules 114 utilize standard integrated circuit (IC) boards to digitize an analog video stream image from the cameras 106, 108.

Continuing with FIG. 3, the digitized images, represented by arrays of numbers, are streamed to pipeline vision processors 116 for preprocessing. The pipeline vision processors 116 utilize dedicated image processing boards for data and image analysis. For example, a pipeline vision processor 116 may be configured to extract specific information from an image. The processed images from each of the pipeline vision processors 116 are sent to an image analyzer processor 118 that further analyzes and processes multiple images of a golf ball 102. The golf ball parameter measuring system 100 of the prior art may further include an image buffer board 120 for data storage. The vision processor 112 of the prior art requires a chassis to house the IC boards of the frame grabber module 114, the pipeline vision processor 116, the image analyzer processor 118, and the image buffer 120. The processed image from the vision processor 116 is sent to a host computer 104 for display on the graphical user interface (GUI) of the host computer 14. The host computer 104 may also include a database for the storage of golf ball characteristics which can be correlated with a particular golf club which was utilized to launch the golf ball.

The golf ball flight parameter measuring systems 100 of the prior art present several disadvantages. As described above, prior art golf ball flight parameter measuring systems 100 require special markings on the golf balls. At least two cameras 106, 108 must be used to achieve precision flight parameters, as well as special optical alignment equipment and triggering equipment 122 to align the cameras and initiate the measurement system after a ball is struck. Thus, there exists a need for a device and method for measuring the in-flight characteristics of a golf ball which provides precision measurements utilizing unmodified golf balls, a single camera for easy set-up and operation, and which does not require cumbersome and error-prone alignment and triggering equipment.

SUMMARY OF THE INVENTION

It is an advantage of the present invention to provide a flight parameter measurement system that utilizes a single camera to capture all the information necessary to establish the in-flight characteristics of a golf ball in three dimensions.

It is an advantage of the present invention to provide a system that measures golf ball flight characteristics using a golf ball without specialized markings.

Another advantage of the present invention is to provide a golf ball flight parameter measurement system that is calibrated in the factory and easy to set up and align in the field.

Yet another advantage of the present invention to provide a golf ball flight parameter measurement system that does not require additional triggering apparatus to initiate the collection of ball flight data.

Still another advantage of the present invention is to provide a golf ball flight parameter measurement system that will also image the golf club prior to impact with the ball and provide golf club angle information.

In an exemplary embodiment of the present invention a single, stand alone camera is utilized to capture images of an object in flight. The camera calculates a trajectory, an azimuth, an elevation, a spin axis, and a speed of rotation of the object in flight from the captured images and known characteristics of the camera. The measurement system does not require any special markings on the ball to determine the spin rate and the spin axis. Instead, the measurement system of the preferred embodiment utilizes non-precision marks, surface blemishes such as cuts made by a club, dimples, or a combination of all three as the only features necessary to determine ball flight characteristics.

A standalone smart camera of the exemplary embodiment provides information to a digital display that is visible to, e.g., a golfer, and displays golf club head face angle, golf ball launch elevation, azimuth and spin. The smart camera includes a lens, an optical area sensor, an analog to digital converter (ADC), a field programmable gate array (FPGA), a large digital memory, a processor, an alignment device, and output circuitry sufficient to drive the display.

The measurement system of the exemplary embodiment has a number of subsystems and associated methods/procedures for measuring fight parameters. The smart camera is calibrated during the manufacturing process. The camera utilizes an alignment device to determine alignment correction factors in the field. The camera of the exemplary embodiment further includes a process for triggering image capture. A series of images of a ball in flight are captured and stored in the camera memory. The camera processor locates the positions of the ball in each captured image and identifies its center and diameter. The position, center and diameter are utilized by the camera to calculate three dimensional coordinates for each ball and a velocity vector. A glint removal process is performed on each ball image to remove "hot" spots in the image by averages of nearby pixels. Lighting normalization is then performed on the ball image to remove visual artifacts from the image. Images are repeatedly rotated, scaled, and correlated to subsequent images to determine the spin axis, spin rate, trajectory and speed of the ball

BRIEF DESCRIPTION OF THE DRAWINGS

The present invention will be better understood from the following detailed description of a preferred embodiment of the invention, taken in conjunction with the accompanying drawings briefly described below, in which like reference numerals refer to like parts.

FIG. 3 is block diagram of a typical prior art golf ball flight analysis system.

FIG. 4 is a block diagram of a calibration and alignment method of the preferred embodiment.

FIG. 5 is a diagram of a camera field of view which maps a real world three dimensional view into two dimensions.

FIG. 6 is an illustration of a method for determining a line of sight for each pixel of the camera field of view as shown in FIG. 5.

FIG. 13 illustrates a method for a method for establishing canonical images of the balls.

FIG. 14A illustrates front view aligned parallel to a Z axis of a hypothetical camera C1 that has been positioned to capture a canonical image B1 of a ball.

FIG. 14B illustrates a side view of the image of FIG. 14A wherein the spin axis is in a plane perpendicular to the trajectory.

FIG. 15A illustrates a rotation of the spin axis to correspond with the Z axis of the hypothetical camera.

FIG. 15B illustrates a side view of the image of FIG. 15A wherein the Z axis and the spin axis are the same.

FIGS. 16A and 16B illustrate a trial rotation of a sphere about a spin axis $Z_c$ in $3d$ space.

FIG. 17A illustrates front view aligned parallel to a Z axis of a hypothetical camera C2 that has been positioned to capture a canonical image B2 of a ball.

FIG. 17B illustrates a side view of the image of FIG. 17A wherein the spin axis is in a plane perpendicular to the trajectory.

FIG. 18 is a flow diagram of a preferred method for rotating, scaling, and correlating images of a ball.

DESCRIPTION OF THE PREFERRED EMBODIMENT

The following detailed description utilizes a number of acronyms which are generally well known in the art. While definitions are typically provided with the first instance of each acronym, for convenience, Table 1 below provides a list of the acronyms and abbreviations and their respective definitions.

TABLE 1

| ACRONYM | DEFINITION |
| --- | --- |
| ADC | Analog to Digital Converter |
| IC | Integrated Circuit |
| CCD | Charged Couple Device |
| CMOS | Complementary Metal Oxide Semiconductor |
| FOV | Field of View |
| FPGA | Field Programmable Gate Array |
| GUI | Graphical User Interface |
| LOS | Line Of Sight |

The preferred embodiment of the flight parameter measurement tracks the surface of an object in motion, e.g., a ball, and determines speed, direction and flight path, a spin axis, and spin rate around that axis. The measurement system does not require any special markings on the ball to determine the spin rate and the spin axis. Instead, the measurement system of the preferred embodiment utilizes non-precision marks, surface blemishes such as cuts made by a club, dimples, or a combination of all three as the only features necessary to determine ball flight characteristics. The use of the measurement system of the preferred embodiment may be extended for all types of balls being set in motion or in motion, including baseballs and tennis balls. In addition, the measurement system may be used for determining flight parameters of other non-spherical objects establishing characteristics, i.e., rules and assumptions, of a specific class of objects.

Figure 1:
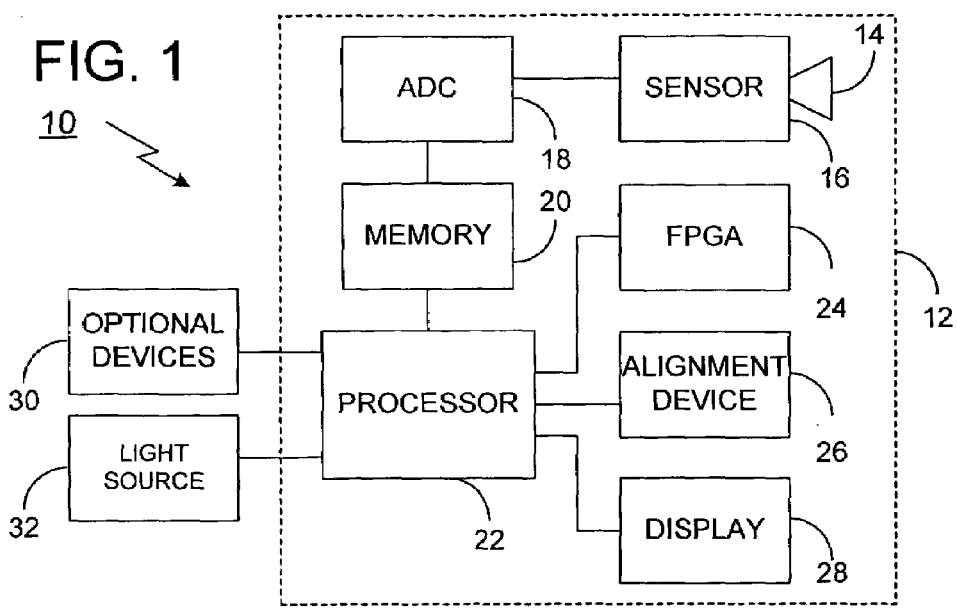
FIG. 1 is a block diagram of a standalone camera system of the preferred embodiment for determining flight parameters of an object in motion.

FIG. 1 illustrates a standalone smart camera approach to a flight parameter measurement system 10 of a preferred embodiment of the present invention. The measurement system 10 includes a single smart camera 12. The smart camera 12 provides information to a digital display 28 that is visible to, e.g., a golfer, and displays golf club head face angle, golf ball launch elevation, azimuth and spin. In the preferred embodiment the smart camera 12 contains a lens 14, an optical area sensor 16, an analog to digital converter (ADC) 18, a field programmable gate array (FPGA) 24, a large digital memory 20, a processor 22, an alignment device 26, output circuitry sufficient to drive the display 28. In alternate embodiments, the display 28 is attached to the camera 12 as a peripheral device. In an exemplary embodiment of the present invention, the smart camera is capable of storing a plurality of images in digital memory and subsequently analyzing those images to determine golf club head and golf ball motion characteristics as discussed below.

The smart camera 12 includes input/output ports for connecting optional devices 30. Such devices include radio frequency transceivers, solar cells etc. In one embodiment of the invention, a pulsed illumination source 32 is used to generate digitized images of a plurality of time-sequential images of a golf ball and/or a golf club head in motion.

Figure 2:
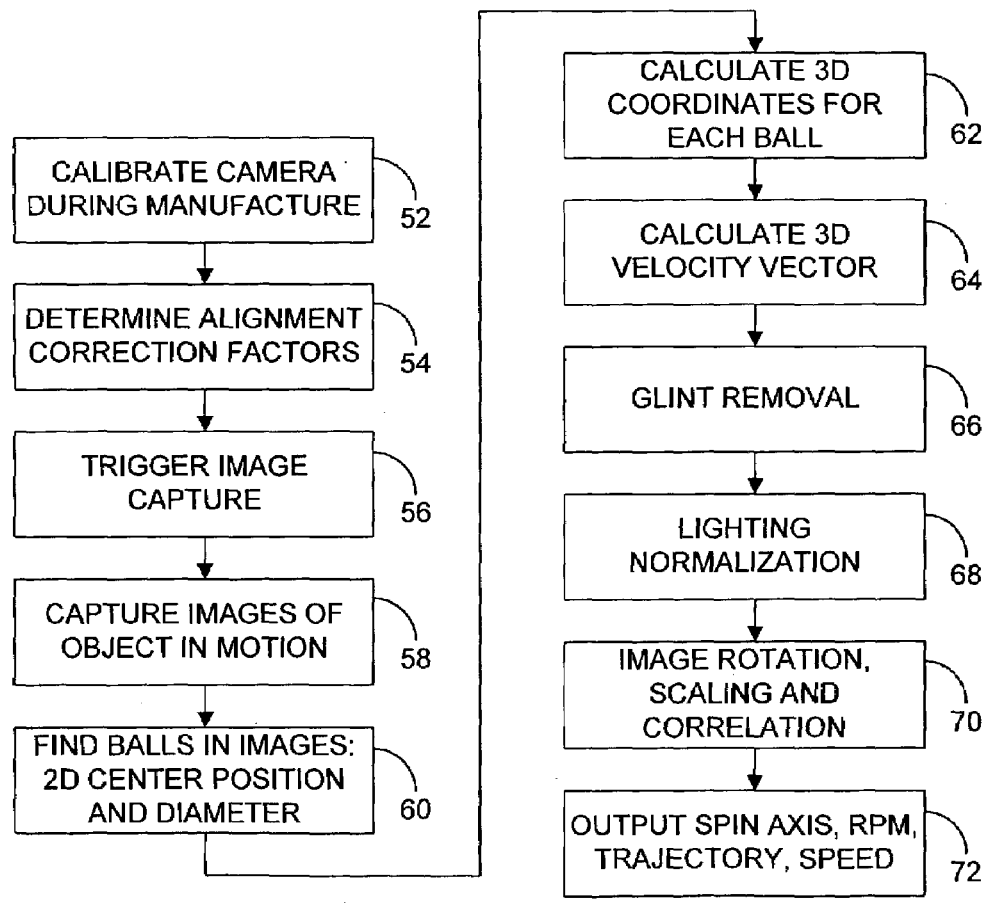
FIG. 2 is a preferred method of determining flight parameters of a ball in motion.

The measurement system 10 of the preferred embodiment has a number of subsystems and associated methods/procedures for measuring fight parameters. FIG. 2 illustrates a preferred method 50 of determining flight parameter measurements of a ball. Each step of the preferred method 50 is explained in detail below. Referring to FIG. 1 and FIG. 2, the smart camera 10 is calibrated 52 during the manufacturing process. The camera 10 utilizes an alignment device 26 to determine alignment correction factors 54 in the field. The camera 10 of the preferred embodiment includes a process for triggering image capture 56. A series of images of a ball in flight are captured 58 and stored in the camera memory 20. The camera processor 22 locates the positions of the ball in each captured image 60 and identifies its center and diameter. The position, center and diameter are utilized by the camera 10 to calculate three dimensional coordinates for each ball 62 and a velocity vector 64.

Continuing with FIG. 2, a glint removal process 66 is performed on each ball image to remove "hot" spots in the image by averages of nearby pixels. Lighting normalization 68 is then performed on the ball image to remove visual artifacts from the image. Images are rotated, scaled, and correlated to a subsequent image 70 to provide the spin axis, spin rate, trajectory and speed of the ball (step 72).

1. Calibration of the Camera

The preferred embodiment of the present invention eliminates the need for alignment equipment and calibration procedures, and provides a ball tracking and measurement apparatus which a non-skilled person can set up in the field, e.g., at a golf driving range or in a golf shop. In the preferred embodiment, the measurement system 10 is accurately calibrated in the factory, i.e., during manufacturing. Calibration of the camera establishes the (X,Y,Z) directions for every (X,Y) in the pixel image plane as discussed further below.

FIG. 4 is an illustration of a calibration and alignment system and process 150 for a smart camera 152 of a preferred embodiment. The camera 152 is placed on an earth tangential table aligned parallel to plane 154. The camera 152 images a reference target 158 in two positions to create a model of the camera lens 162, and to compute a true world coordinate reference, i.e., spatial coordinates that are relative to the target, and thus to earth tangential. Using the precision marks 160 on the target 158, given a known distance from the camera lens 162 to the target 158, and given an orientation of the target 158 to a plane 154, the measurement system calculates a vector for every pixel of the field of view of the camera 152. When an object is imaged in the camera field of view, the position of that object is known in two dimensions since each pixel of the image has a known position in two dimensions.

FIG. 5 illustrates a field of view 170 of a smart camera 152. Every pixel 172 is assigned an X and Y coordinate where z1 is the distance from the camera 152 to a target 158. A pinhole perspective of the calibration process is shown in FIG. 6, where the pinhole P corresponds to the focal point of the camera 152. The camera 152 images a target 158 on an image plane 170 with the target 158 placed at a first "near" position at a distance $Z_N$ from the target. Each pixel of the image of the target is defined by a coordinate, $X_N$, $Y_N$. The target 158 is moved to a second "far" position at a distance $Z_F$ from the target, such that each pixel of the image of the target is defined by a coordinate $X_F$, $Y_F$. Thus, each pixel 172 is defined by two world positions of "near" and "far". The coordinates $X_N$, $Y_N$ and $X_F$, $Y_F$ are utilized to establish a reference line of sight (LOS) 174 for each pixel in the image. In the preferred embodiment of the invention, the camera 152 verifies that the line of sight for each pixel converge at pinhole P.

2. Alignment of the Camera

Referring again to FIG. 4, some of the measurements necessary in the analysis of golf ball launch parameters are made relative to a plane 154 which is tangential to the earth's surface at the point of impact of a club with the golf ball. One part of the alignment process of the preferred embodiment is to accurately align the base of the camera 152, or optical measurement system, relative to such a plane 154. Measurements in the field may have to be adjusted by an offset if the orientation to earth is not level, e.g., the measurement system 152 is placed on an uneven surface.

During the calibration process illustrated in FIG. 4, the camera 152 is placed parallel to a planar surface 154. A two or three-axis accelerometer or inclinometer 156 is used in a preferred method for aligning the camera base 152 with the surface 154. The accelerometer or inclinometer 156 is capable of providing electrical signals to the camera 152 that indicate the extent of camera misalignment relative to the surface 154. These electrical signals are used to provide offset information for golf ball flight calculations such that perfect alignment of the golf ball imaging camera 152 is not necessary. During calibration, the roll and pitch of the camera system 150 is measured and recorded using the accelerometer 156. When the unit is placed in on a surface by the user, e.g., the golfer, the accelerometer orientation measurements are taken and compared to measurements obtained during calibration. Any difference is utilized to compensate for the position of objects in images taken in the field.

An advantage of the calibration and alignment utilized by the present invention is that the flight measurement system 152 may be placed on an uneven surface, such as natural grass or dirt, and automatically align itself to the tangent plane of the earth. Another advantage of this method is that the flight measurement apparatus 152 may be moved from place to place without requiring a manual realignment. For example, if a user is hitting a golf ball off natural turf, he made need to move to a new position from time to time as the turf is destroyed by repeated impacts from the golf club. Measurement and analysis may continue by simply by moving the apparatus 152 and placing it at the new location. The apparatus 152 automatically calculates a new alignment using the camera/lens model created during manufacture without any intervention by the user. In addition, alignment allows for statistical results to be compared between many units in the field due to a common reference.

In an alternate embodiment, the flight parameter measurements are taken relative a the launch platform, e.g., a practice tee platform. The measurement system 152 is calibrated with respect to its base. This embodiment includes a switch mechanism allowing the user to turn off earth tangential and measure relative to the base of the unit.

Another embodiment of the flight parameter measurement system utilizes a two-dimensional bubble level (not shown) in the camera 152 to level the base of the camera with the earth's surface 154. The bubble level is adjusted by means of adjusting screws that rest on the earth's surface 154 and support the imaging camera 152. Alternatively, the bubble of the level is optically imaged, and an electrical signal derived from the offset image of the bubble relative to true level is produced and used in the flight parameter calculations.

Another method of alignment that may be utilized with the flight parameter measurement system is to align the camera 152 in the field by referencing two or three objects placed on the ground in the camera field of view. The objects on the ground are used to estimate the earth's tangential plane relative to the camera placement. The objects also may be used to calibrate azimuth. The objects are precisely located in three dimensions. A line is drawn between three points in space to generate a vector to give azimuth and the elevation reference. The camera 152 calculates an offset between the precision lab calibration values and the estimated tangent plane.

Another method for the alignment of the golf ball imaging camera 152 with the earth's surface is to suspend the camera, pendulum-like, which allows the camera 152 to automatically find level due to the forces of gravity acting on the suspended camera 152. Dampers of the suspension apparatus may be utilized to provide rapid stabilization of oscillations. Since the camera is level with respect to the earth's surface, the precision lab calibration values may be used for flight parameter calculations.

After the camera 152 has been aligned with the earth's surface, additional azimuth alignment is necessary to accurately track a golf ball in flight. Azimuth alignment is obtained by sighting a distant object axially along an axis of the apparatus enclosure that has been pre-calibrated to the optical system during manufacture of the flight parameter measurement system. The sighted object is then used as a reference. This azimuth alignment may be accomplished by means of a laser pointer or a telescopic sighting device, or by direct viewing through a camera lens of a distant object.

In other embodiments of the invention, flight parameter measurement systems for the imaging of objects other than golf balls can be aligned utilizing the methods of this invention. Examples of objects which can be imaged in flight include, but are not limited to, firearm projectiles, base balls, tennis balls, soccer balls, basket balls, hockey pucks and other sports devices.

3. Triggering of the Camera for Image Capture

Measuring and recording the position of a golf club during a portion of its swing before impact with a golf ball, and measurement and recording the position of a golf ball after impact by the golf club requires a precise initiation signal. The preferred embodiment of the flight parameter measurement system utilizes a high speed imaging camera to monitor ball launch conditions. The need for special trigger devices to initiate tracking is eliminated by utilizing the same camera for capturing images in real time. The captured images are used for both precise triggering of recording of images and for subsequent tracking of the flight of the ball.

The camera which is monitoring the stationary golf ball, or an area proximate the launch position before/after impact, continuously acquires images and temporarily records images of the golf ball and its surrounding area. The camera acquires images sufficiently fast to detect the approach of a golf club or golf ball, such that the golf club or golf ball approach event may be utilized to set up trigger conditions which initiate the precision measurement and recording of the golf club during impact with the golf ball, and the subsequent golf ball motion. Through the use of fast, image analysis techniques, certain portions of the acquired images are examined. Specific criteria which eliminates false triggering is utilized to initiate the acquisition of precision images.

In the preferred embodiment, a current image is subtracted, pixel by pixel, from the previous image. The image may be decimated to reduce processing requirements and/or increase signal to noise ratios. The resulting subtracted image is compared against a threshold to detect areas within the image for which motion has occurred. These areas of interest are analyzed further to look for the specific characteristics of a golf club or golf ball.

Figure 7:
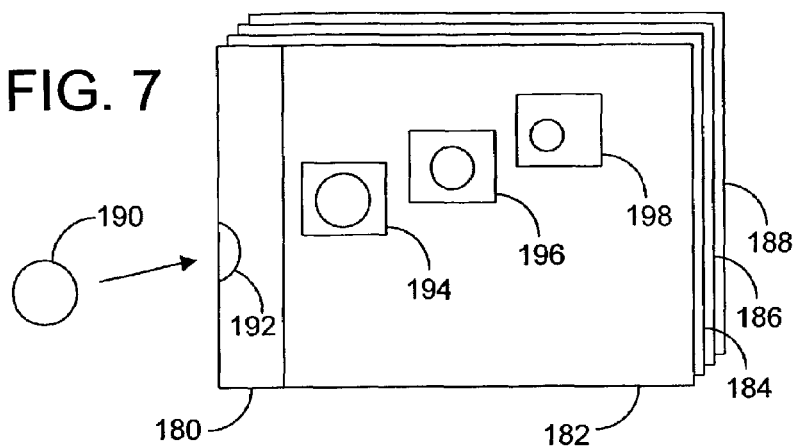
FIG. 7 illustrates camera window frames for triggering and image capture.

FIG. 7 illustrates a method for triggering image capture. A "trigger" portion 180 of the camera window frame 182 is utilized for monitoring when the golf ball 190 or golf club moves or comes into view. Specifically, the camera of the present invention scans certain pixels at very high frame rates. This allows the inventive system to detect when an object 190 enters a pre-determined field of view 180. In the preferred embodiment, the pre-determined, or trigger, field of view 180 is a vertical field, i.e., perpendicular to the plane of the starting position of the ball, that is on the left or right of the camera window 182 depending upon the placement of the camera with respect to the golf player. Once an object image 192 is detected in the trigger field of view 180, the object 192 is analyzed to verify its speed, shape and direction of motion. If these measurements exceed preset thresholds, a valid triggering event is declared and the image capturing process for tracking is initiated. The preset thresholds are used to eliminate false triggering events such as club waggle or movements of the golfer while addressing the ball.

In other embodiments of the invention, apparatus for the imaging of objects other than golf balls can be triggered utilizing the methods of this invention. Examples of objects which can be imaged in flight include, but are not limited to, firearm projectiles, baseballs, tennis balls, soccer balls, basketballs, hockey pucks and other sports devices. Area cameras or single-line-scan cameras can be utilized as the optical imaging devices.

4. Image Capture

The present invention captures independent images of the ball in flight. As shown in FIG. 7, when triggered by the entry of the ball 190 into the trigger field of view 180, the present invention predicts the position of the ball images based upon a calculated trajectory and speed of the ball. A window 194 that is a subset of the camera field of view 184 is defined that will capture an image of the ball at the next predicted position. Since this window 194 requires a small proportion of the pixels in the sensor, images are captured very rapidly, and the position of the window 196, 198 is adjusted as needed to match the extrapolated position of the next image ball. FIG. 7 shows the image windows 194, 196, 198 superimposed on a single field of view 180 to illustrate the movement of the ball in the images. However, each window 194, 196, 198 is from a separate image 184, 186, 188. The current frame as well as previous frames are continuously used to update the predicted position of the ball for the next image capture.

The preferred embodiment of the invention also rapidly evaluates ambient light conditions in real time, and adjusts the camera exposure to optimize the image quality. For example, light conditions may vary from image to image outdoors due to shadows, clouds, etc. The exposure duration is adjusted so that the available light is distributed over the sensor's dynamic range. In addition, the duration of a flash strobe is adjusted to match the exposure time ensuring that adequate light is available to optimize image quality.

In alternate embodiments of the invention, the camera tracks the flight of the ball using the entire frame 184, 186, 188. This method is slower because it requires more processing to isolate the ball in the image. Therefore, fewer images of the ball are captured, and the tracking accuracy is reduced. Thus the preferred method of tracking, i.e., tracking changes in a tiny window which contains the ball image, is more efficient.

5. Finding the Balls in the Images

The preferred embodiment of the flight parameter measurement system uses a single camera that takes two or more high-resolution images of the ball in flight and computes the true three dimensional (3D) flight characteristics. To compute the flight characteristics, the balls must be located in the images. To locate a ball in an image, the image is analyzed to identify the relatively bright area in the image. A bright area corresponding to a ball becomes dimmer towards the edges of the ball in a symmetrical manner. Thus, other bright spots that may be in the image are not mistaken for a ball. Obviously, the analysis used to locate an object in the image will vary depending upon the shape and other characteristics of the object.

Figure 8:
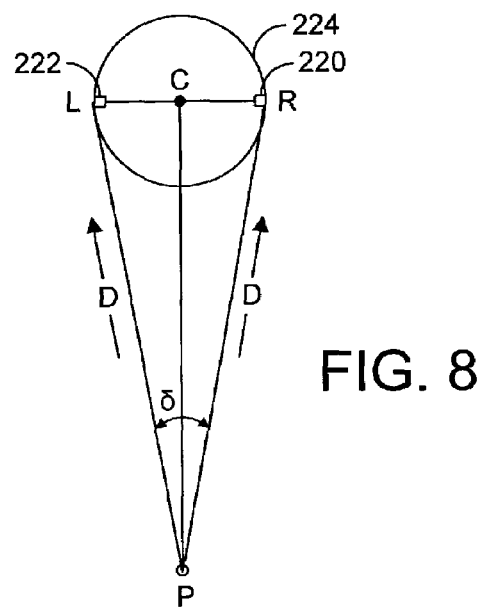
FIG. 8 illustrates a preferred method of finding the distance from the camera to the ball.

Once the ball is located in the image, a leftmost pixel 222, as shown in FIG. 8, and a rightmost pixel 220 are located using sub-pixel techniques. The location of the center of the ball on the image plane is determined to be halfway between the leftmost and rightmost pixels 222, 220.

6. Calculating 3D Coordinates

FIG. 8 illustrates a preferred method for finding the distance of a ball 224 in an image from the camera. Utilizing the calibration information, the system computes a 3D-world direction vector from the camera focal point P to the center C of each ball. As discussed above, the rightmost pixel 220 and leftmost pixel 22 of the grayscale image are located using sub-pixel techniques to determine the diameter of the ball, given by the vector LR. Since balls are manufactured to exacting dimension and are generally 1.68 inches in diameter, the distance D to the ball is calculated using the calibration model for the camera. Specifically, vector PL represents the line of sight to the leftmost pixel 222, and vector PR represents the line of sight to the rightmost pixel 220. The distance of the ball from the camera in comparison to the diameter of the ball is such that the vectors PL and PR are effectively tangential to the ball 224 at the leftmost and rightmost pixels 222, 220. Since the angle δ between the right and left line of sights are known, and the standard diameter of a ball is known, the distance D is calculated as follows from the law of cosines of Equation 1:

$$c^2 = a^2 + b^2 - 2ab * \cos \delta \qquad \text{Equation 1}$$

$$1.68^2 = D^2 + D^2 - 2D^2 * \cos \delta = 2D^2 * (1 - \cos \delta), \text{ and}$$

$$D = SQR(1.68^2/(2*(1-\cos \delta))) \qquad \text{Equation 2}$$

This procedure is performed on each ball and a least squared fit of the flight path is performed to improve system accuracy. Each pixel of a ball image is now defined as having X, Y, and Z coordinates.

Figure 9:
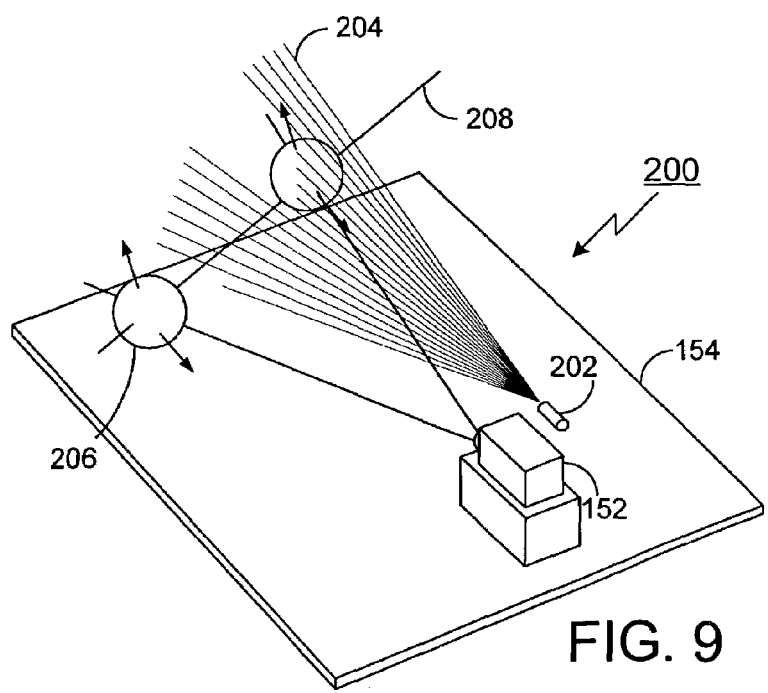
FIG. 9 is an illustration of a golf ball measurement system using a structured light source.

Single Camera with Structured Light Source. The preferred embodiment of the present invention uses a single camera that takes two or more high-resolution images of the ball in flight and computes the true 3D flight characteristics. As illustrated in FIG. 9, a system of an alternate embodiment may also have a structured light source 202, such as a laser plane 204 or array of laser dots, that is spatially calibrated to intersect with the field of view of a single camera 152. The system captures multiple images of the ball 206 during its flight, with one or more images taken while the ball is illuminated by the structured light source 202. Assuming the camera system 152 is calibrated to world coordinates, the system 152 computes a 3D vector for a line from the camera 152 which intersects the ball 206 at the point of illumination by the structured light source 202. Since the position and directional orientation of the light source 154 relative to the camera 152 is known, the 3D intersection on the circumference of the ball of the line from the camera 152 and the light source 202 is computed using standard triangulation techniques. The laser source may also be used for illumination for triggering and initiation of ball tracking.

Given the 3D position of a point on the surface of the ball 206, and the known diameter of the ball, the location of the center of the ball must lay along the sight line 162 from the camera. The range to the center of the ball from the camera 152 also is calculated. Using this method, an accurate depth measurement from the camera 152 to the ball 206 is determined in order to calculate the trajectory of the ball 206 in three dimensions. This enhances the accuracy of the calculation of golf ball flight characteristics and enables launch azimuth to be determined as well.

If the structured light source 202 is an array of points, or has multiple planes, it becomes difficult to determine which light beam or plane the ball is intersecting. To resolve this problem a rough range to each ball 206 is computed by looking at the diameter of each ball, knowing the actual ball diameter and using the camera model to compute a range. By using this range envelope, and selecting the proper spacing and geometry for the structured light source, a single solution is computed. If the structured light source 202 is a wide angle light, the boundary between the light and the shadow regions on the ball 206 is used similarly to a laser plane. A 3D point on the surface of the ball 206 is calculated by triangulation, and the range to the center of the ball 206 from the camera 152 is calculated as described in the preceding paragraph.

6. Calculating the Velocity Vector

The size of the ball in each image, the position of the ball in each image, and the calibration information is used to determine a 3D position of the ball as discussed above. The 3D positions of at least two balls in real-world space and the time stamps associated with each image then are used to calculate a velocity vector, that is, the speed and direction of the ball.

Figure 11A:
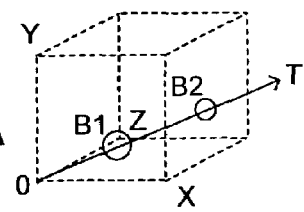
FIG. 11A is an illustration of a three dimensional trajectory path of a ball showing the ball B1 at a first position and the ball B2 at a second position.
Figure 11B:
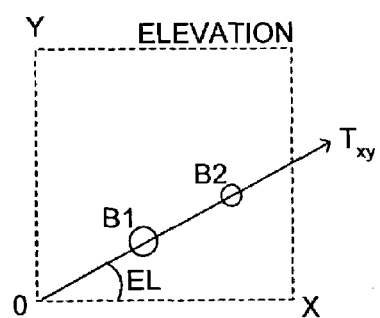
FIG. 11B illustrates the elevation angle in the XY plane of the trajectory of the ball of FIG. 11A.
Figure 11C:
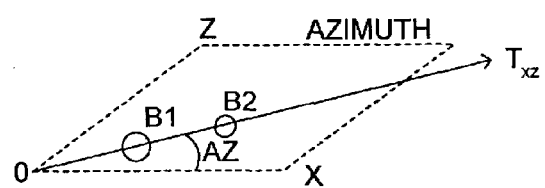
FIG. 11C illustrates the azimuth angle in the XZ plane of the trajectory of the ball of FIG. 11A.

The 3D positions of imaged balls B1, B2 at two different time stamps reveals the trajectory T of the ball, as shown in FIG. 11A. The trajectory T has an elevation and an azimuth. The elevation angle EL is a rotation about the Z axis, as illustrated in FIG. 11B, and is determined from the change in vertical positions of the ball images B1, B2. The azimuth angle AZ, as illustrated in FIG. 11C, is the drift of the ball away from or towards the camera. Thus, the azimuth angle is a rotation about the Y axis. The elevation and azimuth angles are necessary for calculating the spin of a ball.

7. Glint Removal

Based on the type of illumination used, or ambient lighting conditions, spectral reflections or glints may be present in the image. These glints typically form on the surface of the ball facing the camera. Glints are always bright in nature, generally much brighter than the surrounding pixels. Glints may or may not change position as the ball rotates. Since correlation is a pixel by pixel matching of two images, global intensity differences due to illumination differences, or differences in the amount of light reflected, or surface features that do not move with the rotation of the ball create noise in the system. Therefore, prior to correlation, each ball image is prepared by performing glint removal and lighting normalization. A simple threshold against a local average, or a statistical look at a local group of pixels, is used to detect and remove glint pixels from the image prior to all other processing. The glint pixels are replaced with pixels based upon local averages.

8. Lighting Normalization

Compensation for non-uniform illumination or multiple light sources must be accomplished for proper ball correlation. For grayscale correlation on a pixel by pixel basis, the pixel intensities must match as close as possible. Because the images are captured at different spatial positions and under differing ambient lighting conditions, the illumination varies over the visible surface of the ball. Under uniform lighting conditions, concentric rings of increasing diameters around the center of the ball have illumination drop off as the curved surface of the ball angles away from the camera and light source. Additionally, each concentric ring has a constant average illumination as the ring is traced around the entire diameter. Thus, each concentric ring of the same diameter in each ball image should also exhibit the same average grayscale intensity.

Figure 12:
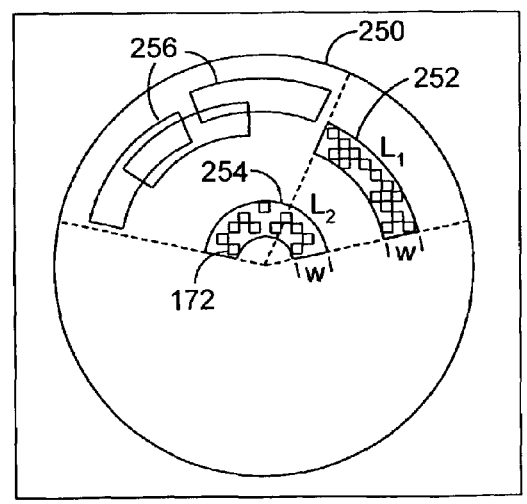
FIG. 12 illustrates a method of the preferred embodiment for normalizing the pixels of an image of a ball.

FIG. 12 illustrates a preferred method for normalizing the ball images 250. The actual pixel brightness average is generated for many radial bands 252, 254, 256. Each radial band 252, 254, 256 a width "w" of a common value. The lengths of the bands vary in such a way to ensure that all bands have a similar or equal number of pixels 172. The number of bands may be chosen according to a desired uniformity of pixel brightness of the image. The averages are used to adjust the pixel values by a percentage such that the "normalized" band has the desired average, i.e., a desired average pixel brightness, in the vicinity of a pixel, and on the entire ball. For each radial band, any regions that exhibit a large change in intensity are scaled to make the profile of each ring uniform.

9. Rotation, Scaling and Correlation

A key feature of the method of this patent is in determining the spin rate and axis for a sequence of 2D images of a golf ball with no marks or non-precision marks. The method looks at consecutive images of a ball in flight and uses mathematical transformations and correlation to track the movement/rotation of natural surface features, dimples, man made marks or blemishes. The method does not require any precise markings to be placed on the ball and will produce reliable results even if there are no man made marks on the ball other than natural surface features and blemishes. The model takes into account camera perspective and transforms the rotation into a world coordinate spin axis and spin rate.

Figure 10:
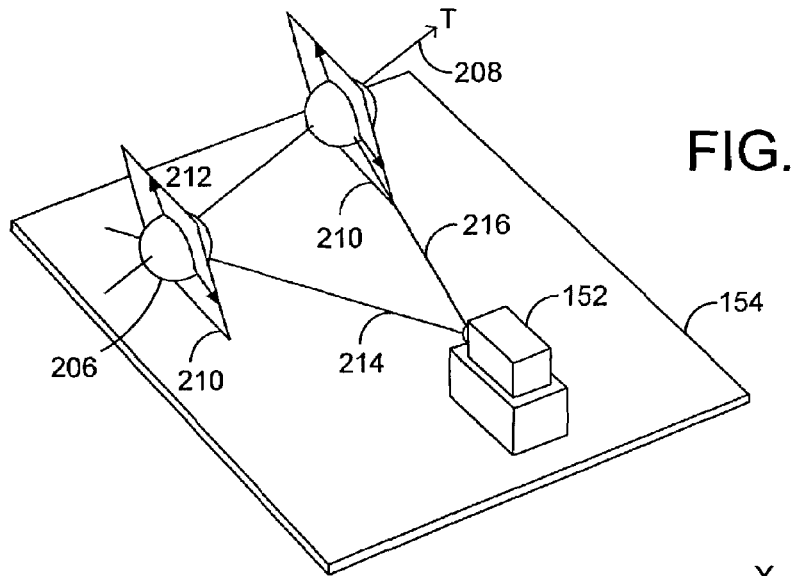
FIG. 10 illustrates a flight parameter measurement system of the preferred embodiment imaging a ball in flight.

As illustrated in FIG. 10, certain assumptions can be made about the behavior of the rotating ball 206 after being struck by a golf club. First, golf balls have no or negligible rifle spin which is defined as rotation about an axis 208 which is parallel to the direction of flight. Secondly, a spinning golf ball behaves gyroscopically having a fixed spin axis 212 after being struck by the club head. With these assumptions, it is known that the spin axis 212 must lay in a plane 210 that is orthogonal to the direction of flight, or trajectory T. Further, the spin axis 212 must pass through the center of the ball 206 and does not change orientation significantly after impact.

a. Frame of Reference

A basic frame of reference is defined herein for discussion. For the preferred embodiment, proper selection of the position of the camera or cameras can minimize the degree of distortion and increase spin resolution. For the maximum resolution, the camera or cameras should have a view that is as close as possible to parallel to the spin axis of the projectile. If the spin axis is pointing directly at the camera then most of the rotation will be about the center of the 2D image. This increases the number of correlation pixels and maximizes the ability to correlate more distant balls since points on the surface will not rotate out of the field of view. For purposes of this discussion assume the following: Y axis is in image plane pointing up; X axis is in image plane pointing right; Z normal to image plane pointing at the viewer; and rotation order is around X then around Y then around Z.

The following equations are used to rotate 3D points, where Cos 1 and Sin 1, Cos 2 and Sin 2, Cos 3 and Sin 3 are the rotation angles around X, Y and Z respectively:

Rotate points around X:

$X1 = X$      Equation 3

$Y1 = Y*\cos 1 - Z*\sin 1$      Equation 4

$Z1 = Z*\cos 1 + Y*\sin 1$      Equation 5

Rotate points around Y:

$X1 = X*\cos 2 + Z*\sin 2$      Equation 6

$Y1 = Y$      Equation 7

$Z1 = Z*\cos 2 - X*\sin 2$      Equation 8

Rotate points around Z:

$X1 = X*\cos 3 + Y*\sin 3$      Equation 9

$Y1 = Y*\cos 3 - X*\sin 3$      Equation 10

$Z1 = Z$      Equation 11 b. Preferred Method for Determining Spin Axis

The method of the preferred embodiment for determining the spin axis an rotation of a ball about that axis requires selection of a reference ball image B1 and a target ball image B2, as shown in FIG. 13. Each of these images has information associated with it including the angle of the azimuth, the angle of elevation, the center of the ball and diameter of the ball described above. In addition glint has been removed from the images, and the images have been lighting normalized.

FIG. 18 is a flow diagram of a preferred method for determining the spin axis and rotation speed of a ball about the spin axis. In a first step 300, a canonical view of the reference ball B1 is determined. A "canonical" view is used herein to describe the simplest or most symmetrical view to which all of the ball images can be reduced in order to map every image in a one-to-one manner to another image. In a second step 301, the rotation envelopes or ranges are determined for the X, Y and Z axes, as well as the incremental steps ranges i, j, and k for each rotation. The spin axis of canonical image B1, which lies in the XY canonical plane, is rotated in step 302, and then rotated on the canonical Z axis in step 304. The canonical image B1 is then rotated to the X,Y,Z coordinates of a target ball image B2, in step 304. The resulting reference ball image B1 is scaled to ball image B2, in step 305. In step 306, the resulting reference ball image B1 is correlated to target image ball B2. The score of the correlation is compared to a previous correlation score in step 307. If the score is improved, that is, a better correlation result, then the rotation X(i), Y(j), Z(k) is stored. If all of the increments within the range have not been tried, as determined in step 309, the next incremental values of rotation are applied to the reference ball image B1. The steps of rotation, scaling, and correlating are repeated in a stepwise refinement manner, in step 311, until a desired smallest incremental range of rotations is complete to ensure a best correlation.

c. Converting a Reference Ball Image B1 to a Canonical View.

Since the correlation is performed in the 2D-image plane the reference ball image B1 must be converted from the 3D world coordinate system to the 2D-image plane. This is accomplished using the 3D world vector that originates from the camera and passes through the center of each ball. For each vector, the azimuth and elevation of that vector relative to the nominal spin axis is computed and used as an offset for the 2D spin axis search, where nominal spin axis is the axis parallel to the earth tangent plane and orthogonal to the direction of flight. FIG. 13 illustrates canonical camera views of the ball images B1 and B2 as seen by hypothetical cameras "c1" and "c2" that have been aligned from the imaging position to positions in line with the spin axes, $Z_{c1}$ and $Z_{c2}$. FIG. 14A illustrate a front view of the canonical image B1, where the trajectory $T_c$ lies along the X axis of the canonical view. FIG. 14B is a side view of the canonical ball image B1 of FIG. 14A. In FIG. 14B, the spin axis 212 is shown at an hypothetical angle.

d. Determining Rotation Ranges and Increments.

Determining rotation ranges and increments, Step 301 of FIG. 18, significantly reduces the number of calculations required for using correlation to find the spin. Certain assumptions about the spin axis 212 are made. It is known that balls, such as golf balls, have negligible, or no, rifle spin, and that golf balls are gyroscopic in nature having a fixed spin axis 212 once they leave the club head. Additionally, since the club face is angled upward for impacting the ball 206, the spin imparted to the ball by the club face will always be backspin for a normal golf shot. With these assumptions, the axis of spin 212 is estimated to a portion of plane 210, as shown in FIG. 13, that is orthogonal to the direction of flight 208. In addition, it is assumed that the spin axis goes through the center of the ball and does not move substantially after impact. The range of possible spin rates is further reduced by empirically determining spin rate versus shot speed and launch angle, and using this data to improve the estimate of the axis and the amount of rotation search range.

e. Rotating, Scaling, Translating and Correlating the Grayscale Image

Correlation is a common two-dimensional image processing technique to find a best spatial match between two images by making a series of successive comparisons. The images are incrementally translated, rotated, scaled, and differenced (pixel by pixel) by a computer until a the spatial orientation with the minimum difference is detected. To maximize system resolution, as many ball images as possible should be captured during the initial flight of the ball. This helps to reduce the chance of false correlation and improve speed when correlating more distant balls due a better estimate of a spin range. After an approximation is developed, correlation is performed between more distant balls to increase resolution. A least squares fit or averaging is used where appropriate to utilize all available information and achieve the highest precision measurement as possible.

To correlate two ball images captured by the camera at different points in the trajectory, the first ball image is mathematically transformed to create a new image of the ball as it would appear had the camera had imaged it at the same location as the second ball image, as described above as a "canonical view", step 300 of FIG. 18. Where Rx is defined as a rotation about the X axis, Ry is defined as a rotation about the Y axis, and Rz is defined as a rotation about the Z axis, the canonical view of the reference ball image B1 is determined by a first set of rotations as follows: Rx (−X1); Ry (−[y1+AZ]; and Rz(−EL)], where "AZ" and "EL" represent the azimuth angle and elevation angle, respectively.

Once the image is in a canonical form, a trial spin axis is selected, as illustrated in FIG. 15A, where the ideal selection aligns the spin axis with the line of sight to the camera. FIG. 15B illustrates the side view wherein the spin is parallel to the line of sight. FIGS. 16A and 16B illustrate a trial rotation of the sphere about that spin axis $Z_c$ in 3D space. This second set of trial rotations, steps 302 and 303 of FIG. 18, are described as follows: Rx(Xi) in an example range of −20<Xi<20; Ry(Yj) in an example range of −10<Yj<10; and Rz(Zk) in an example range of −20<Zk<0.

The image then is mapped back to 2D image space as it would appear to the camera at the extrapolated position corresponding to the second image of B2, as illustrated in FIGS. 17A and 17B. This third set of rotations, step 304 of FIG. 18, is described as follows: Rx (X2); Ry ([Y2+AZ]; and Rz(EL)], where "AZ" and "EL" represent the azimuth angle and elevation angle, respectively.

After the transformation, standard 2D correlation is performed directly between the grayscale images of the rotated reference image B1 and the target image B2. This process of selecting a trial spin axis, performing a trial rotation in 3D space and mapping the image back into 2D space for correlation is repeated until the minimum difference correlation is found.

Although the rotation sets are described above as separate steps, it should be appreciated, as known in the art, that 3D rotation may be accomplished by creating a "rotation matrix" for each step, and then multiplying the matrices into a single "combined" rotation, which has the coefficients used for rotating pixels.

f. Converting Correlation Results to Real World Coordinates

Once the spin is determined from correlation, the rotation axis and magnitude are converted to the line of flight, and then the line of flight is converted to world coordinates. These rotations are easily performed by using the equations 3-11. Since the temporal information about the shot is also known the spin magnitude can be converted to spin rate is any desired units.

g. Additional Correlation techniques and Dimple Tracking

Additional techniques exist that may be used in conjunction with or independently to grayscale correlation. Logos or other types of high contrast marks on the ball are used to increase correlation accuracy. These pixels are much darker than the neighboring pixels and can be separated from dark pixels caused by the shadow of a dimple. A simple threshold against a local average, or a statistical look at a local group of pixels, is used to detect and label logo pixels. This way they can be processed as a special case, or given more weight than other surface features used during correlation. An advantage of using logos exclusively is that the tracking process can be made contingent on finding a specific logo on the ball. Darker pixels potentially representing a logo are compared to a known logo pattern in order to detect a match. The logo pattern is mathematically transformed as previously described to match the position of the potential logo on the ball before the correlation can be performed. If a logo cannot be located, the tracking process is suspended or defaults to use the grayscale correlation process previously described.

Detecting the center of each golf ball dimple is another method that may be combined with or used separately from grayscale correlation. Dimples are 3D in nature and create shadows that are dark and light in appearance as their location on the surface of the ball moves towards the edge of the image. A series of filters is used corresponding to various dimple sizes and shadow patterns to locate the center of the dimples. The filters are used to locate characteristic shadow patterns of a dimple at various distances from the center of the ball. The filters adjust for ball diameter, variations in dimple size and eliptical distortion as the edge of the ball image is approached. The filters identify dark to light transition areas in the image characteristic of dimples as they are applied outward from the center of the ball along a radial line. For the region that directly faces the camera the filter will extract dark circles with lighter centers characteristic of a dimple facing the light source. Once the location of as many dimples as possible is determined, the mathematical centers are correlated. The detection accuracy of dimples diminishes as the detection process moves from the center of the ball outward. Therefore, greater weights are placed on correlations involving dimples closest to the center of the ball measured radially.

Although a preferred embodiment of the invention has been described above by way of example only, it will be understood by those skilled in the field that modifications may be made to the disclosed embodiment without departing from the scope of the invention, which is defined by the appended claims.

I claim:

1. A method for determining parameters of an object in motion, the method comprising the steps of:
   capturing a plurality of images of the object in motion;
   finding a respective object image in each of the plurality of images;
   rotating a first object image of the plurality of object images by a first set of rotations of a plurality of rotation sets;
   scaling the rotated first object image to a second object image;
   correlating the first object image to the second object to obtain a score;
   repeating the steps of rotating, scaling and correlating in a stepwise refinement manner to obtain a best score of the plurality of scores;
   utilizing a best rotation set of the plurality of rotation sets to determine the parameters of the object in motion;
   calculating three dimensional coordinates for each of the plurality of object images;
   determining an elevation angle and an azimuth angle of the object from the three dimensional coordinates for each of the plurality of object images; and further including the step of determining an alignment correction using an accelerometer for indicating misalignment of a camera to earth tangential, to compensate for any difference between the current orientation of the camera and a previously calibrated orientation.

2. The method of claim 1, wherein the step of rotating the reference image of the plurality of images by the first set of rotations further comprises the step of rotating the reference image to a canonical view.

3. The method of claim 1, further comprising the step of removing glint from the plurality of images.

4. The method of claim 1, further comprising step of light-normalizing the plurality of images.

5. A measurement system for determining at least one characteristic of substantially spherical object in motion, the measurement system comprising:
   a camera for capturing images;
   a memory device coupled to the camera for storing images; and
   a processor coupled to the memory device, the processor adapted to perform the following steps:
   (a) capturing a reference image and a target image by using the camera;
   (b) mapping the reference image to the surface of a sphere creating a spherical reference image;
   (c) selecting a three-dimensional trial spin axis from a plurality of three-dimensional trial spin axes;
   (d) performing a trail rotation of the spherical reference image about the three-dimensional trial spin axis;
   (e) transforming the spherical reference image based on a perspective of the target image to the camera;
   (f) mapping the spherical reference image to two-dimensions creating a new reference image;
   (g) correlating the new reference image to the target image to obtain a score of a plurality of scores, wherein each score is associated with the trial spin axis and the trial rotation;
   (h) repeating steps (c) through (g) in a step-wise refinement manner to obtain a desired correlation score of the plurality of scores; and
   (i) calculating the characteristic of the spherical object based on the trial spin axis and trial rotation associated with the desired correlation score.

6. The measurement system as in claim 5, further comprising a structured light source at a known position relative to the camera, the light source emitting a spatially calibrated light that illuminates at least one of the reference image or the target image, and wherein the processor is further adapted to determine a three-dimensional location of either the target image or the reference image based on the spatially calibrated light and the position of the structured light source.

7. The measurement system as in claim 5, further comprising a display for outputting the at least one characteristic of the object in motion.

8. The measurement system as in claim 5, further comprising at least one input/output port coupled to the processor for connecting at least one optional devices.

9. The measurement system as in claim 8, wherein the at least one optional device is a radio frequency transceiver for transmitting the at least one characteristic of the object in motion.

10. The measurement system of claim 5, the processor further adapted to perform the step of removing glint form the reference image and the target image.

11. The measurement system of claim 5, the processor further adapted to perform the step of light-normalizing the reference image and the target image.

12. The measurement system of claim 5, wherein the characteristic is the spherical object's spin rate.

13. The measurement system of claim 5, wherein the characteristic is the spherical object's spin axis.

14. The measurement system of claim 5, the processor further adapted to:
  use an inclinometer to calculate an alignment correction factor; and
  adjust the characteristic based on the alignment correction factor.

15. The measurement system of claim 5, wherein prior to step (a) the processor captures a plurality of images of the spherical object by using the camera and analyzes the plurality of images to detect the movement of the spherical object.

16. The measurement system of claim 5, wherein the camera comprises a field of view, the processor further adapted to define a subset of the field of view, wherein the subset contains at least the reference image or the target image.

17. The measurement system of claim 5, wherein the correlating step (g) comprises using a natural surface feature on a surface of the spherical object.

18. The measurement system of claim 5, wherein the correlating step (g) comprises using a surface blemish on a surface of the spherical object.

19. The measurement system of claim 5, wherein the surface blemish comprises a cut on a surface of the spherical object.

20. The measurement system of claim 5, wherein the correlating step (g) comprises using dimples on a surface of the spherical object.

21. The measurement system of claim 5, wherein the correlating step (g) comprises using non-precisions marks on a surface of the spherical object.

22. The measurement system of claim 5, wherein the correlating step (g) comprises using a man-made and imprecise mark on a surface of the spherical object.

23. The measurement system of claim 5, wherein the correlating step (g) comprises using a high contrast mark on a surface of the spherical object.

24. The measurement system of claim 23, wherein the high contrast mark comprises a logo.

25. The measurement system of claim 5, wherein the spherical object has an unmarked surface, that is, no additional markings have been added to the surface of the spherical object.

26. The measurement system of claim 5, wherein the spherical object is a golf ball.

27. A method for determining flight parameters for a ball, comprising:
  (a) capturing a reference image and a target image of the ball using a camera;
  (b) mapping the reference image to the surface of a sphere creating a spherical reference image;
  (c) selecting a three-dimensional trial spin axis from a plurality of three-dimensional trial spin axes;
  (d) performing a trail rotation of the spherical reference image about the three-dimensional trial spin axis;
  (e) transforming the spherical reference image based on a perspective of the target image to the camera;
  (f) mapping the spherical reference image to two-dimensions creating a new reference image;
  (g) correlating the reference image of the ball to the target image of the ball to obtain a score of a plurality of scores, wherein each score is associated with the trial spin axis and the trial rotation;
  (h) repeating steps (c) through (g) in a step-wise refinement manner to obtain a desired correlation score of the plurality of scores; and
  (i) determining a flight parameter for the ball based on the trial spin axis and trial rotation associated with the desired correlation score.

28. A method for determining flight parameters for a ball according to claim 27, wherein the correlating step comprises using a natural surface feature on the ball's surface.

29. A method for determining flight parameters for a ball according to claim 27, wherein the correlating step comprises using a surface blemish on the ball's surface.

30. A method for determining flight parameters for a ball according to claim 29, wherein the surface blemish comprises a cut on the surface of the ball.

31. A method for determining flight parameters for a ball according to claim 27, wherein the correlating step comprises using dimples on the ball's surface.

32. A method for determining flight parameters for a ball according to claim 31, wherein the correlating step further comprises finding centers for a plurality of the dimples.

33. A method for determining flight parameters for a ball according to claim 27, wherein the correlating step (g) comprises using non-precisions marks on the ball's surface.

34. A method for determining flight parameters for a ball according to claim 27, wherein the correlating step (g) comprises using a man-made and imprecise mark on the ball's surface.

35. A method for determining flight parameters for a ball according to claim 27, wherein the correlating step (g) comprises using a high contrast mark on the ball's surface.

36. A method for determining flight parameters for a golf ball according to claim 35, wherein the high contrast mark comprises a ball logo.

37. A method for determining flight parameters for a ball according to claim 27, wherein the correlating step (g) comprises using a ball having an unmarked surface, that is, no additional markings have been added to the ball's surface.

38. A method for determining flight parameters for a ball according to claim 27, wherein the determining step (i) comprises determining a spin axis for the ball.

39. A method for determining flight parameters for a ball according to claim 27, wherein the determining (i) step comprises determining a spin rate for the ball.

40. A method for determining flight parameters for a ball according to claim 27, further comprising:
  generating alignment correction factors responsive to an alignment device, and
  using the alignment correction factors in determining the flight parameter.

41. A method for determining flight parameters for a ball according to claim 40, wherein the alignment device comprises an inclinometer, accelerometer, or an electronic level.

42. A method for determining flight parameters for a ball according to claim 27, further comprising the removal of glint from the reference image and the target image.

43. A method for determining flight parameters for a ball according to claim 27, further comprising the light normalization of the reference image and the target image.

44. A method for determining flight parameters for a ball according to claim 27, further comprising that prior to step (a) capturing a plurality of images of the ball by using the camera and analyzing the plurality of images to detect the movement of the ball.

45. A method for determining flight parameters for a ball according to claim 27, further comprising:
  using a structured light source at a known position relative to the camera, the light source emitting a spatially calibrated light that illuminates at least one of the target image or the reference image, and determining a three-dimensional location of either the target image or the reference image based on the spatially calibrated light and the position of the structured light source.

46. A method for determining flight parameters for a golf ball, comprising:

capturing a first image while a golf ball is in flight;

finding a first image of the golf ball in the first image;

capturing a second image while the golf ball is in flight, the golf ball having moved along its flight path;

finding a second image of the golf ball in the second image;

correlating, without using specialized markings, the first image of the golf ball to the second image of the golf ball; and determining spin information for the golf ball; and wherein the correlating step comprises using dimples on the ball's surface and finding centers for a plurality of the dimples.

\* \* \* \* \*